May 12, 1970  D. H. DESTY  3,511,487
METHOD OF LIGHTING A FLUIDISED BED FURNACE
Filed June 19, 1968
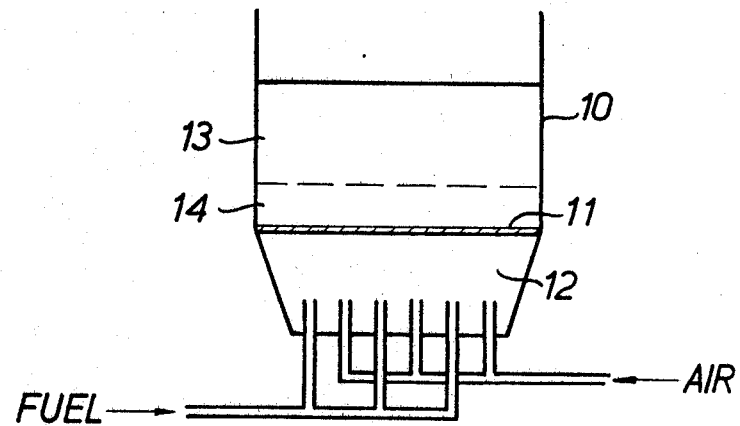
INVENTOR
DENIS HENRY DESTY
BY
Morgan, Finnegan, Durham & Pine
ATTORNEYS United States Patent Office

3,511,487
Patented May 12, 1970

3,511,487
METHOD OF LIGHTING A FLUIDISED BED FURNACE
Denis Henry Desty, Walton-on-Thames, England, assignor to The British Petroleum Company Limited, London, England
Filed June 19, 1968, Ser. No. 738,243
Claims priority, application Great Britain, July 4, 1967, 30,663/67
Int. Cl. F27b *15/00*
U.S. Cl. 263—52                                    2 Claims

ABSTRACT OF THE DISCLOSURE

A mixture of fuel gas and oxygen (air) is passed through a non-fluidised bed and the effluent gas is lit to burn above the bed so that the top surface of the bed is heated.

As the gases pass from the cold bottom zone to the hot surface zone their volume and viscosity increase and hence the surface zone is fluidised. Combustion now takes place in the hot fluidised zone.

Heat is transferred from the hot fluidised zone into the cold non-fluidised zone until, at the end of the process all the furnace bed has achieved the hot fluidised condition.

---

This invention relates to a method of lighting a fluidised bed furnace.

It is known to operate fluidised bed furnaces by blowing a combustible mixture of gases through a particulate material so as to maintain it in a fluidised state at the temperature of operation. The gases burn within the bed so that it is maintained at an elevated temperature, e.g., 800–1800° C. The factors controlling the use of these furnaces are well understood and the most important are the selection of an inert particulate material for the bed and the selection of a gas flow rate which will both keep the bed in a fluidised condition under working conditions and provide sufficient energy input to balance heat losses.

However the method of lighting a fluidised bed furnace gives difficulty. The method which has been conventionally employed comprises heating the furnace by external means until the bed reaches the working temperature then fluidising it at the working temperature by means of an inert gas. At this stage the combustible gases are introduced and these ignite to provide the energy input to maintain the heat balance.

This method of lighting is inconvenient and it is an object of the invention to reduce the difficulties.

According to the invention a method of lighting a fluidised bed furnace comprises passing a cold combustible mixture of gases through the cold bed at a flow rate which is too small to fluidise the bed and igniting the effluent gases so that they burn in contact with and thereby heat the top of the bed to create a hot zone which is initially a surface layer and a cold zone which initially includes all the bed except the surface layer; continuing to pass the combustible gases through the bed at a flow rate which maintains the cold zone in a non-fluidised condition and the hot zone in a fluidised condition in which the combustible gases burn within the fluidised zone; heat being transferred from the hot to the cold zone until the whole bed achieves the hot fluidised condition.

It is usually possible to select a range of mass flow rates of gas which are insufficient to fluidise the bed under cold conditions but sufficient to fluidise it under hot conditions. In such a case it is possible to select a mass flow rate within the range and carry out the process under constant mass flow conditions.

The invention will now be described by way of examples with reference to the drawing which shows a fluidised bed furnace part way through the lighting process.

The furnace consists of a cylindrical pot 10 which contains particulate material supported on a porous plate 11 to form the bed. Fuel gas and air are separately supplied to the chamber 12 where they mix and pass through the plate 11 into the bed.

At the stage shown in the drawing an upper zone 13, a hot fluidised zone, has reached working temperature while a lower zone 14, a cold un-fluidised zone, is still at low temperature. The interface between these zones at this stage is indicated by the dash line shown in the drawing. The gas/air mixture percolates upwards through the unfluidised cold zone 14 until it reaches the base of the hot fluidised zone 13. There ignition takes place so that the gases burn to provide the heat which maintains the temperature in the hot zone. At the same time the rise in temperature causes the volume and the viscosity of the gases to increase so that the flow conditions are altered to such an extent that the gas flow which failed to fluidise the cold zone 14 maintains the hot zone 13 in a fluidised state. Heat is transferred from the hot zone into the cold zone so that the hot zone grows at the expense of the cold until the whole bed has achieved working conditions.

At the start of the process the gases penetrate the entire bed before burning in the air space above the bed. However this combustion heats the upper surface of the bed to produce an intial hot zone which thereafter spreads as described above.

In a laboratory test the material in the bed was ground refractory brick having a particle size of 16–25 mesh. The dimensions of the furnace were:

|  | Inches |
|---|---|
| Diameter of pot | 10 |
| Depth of pot | 8 |
| Depth of unfluidised bed | 2½ |

Methane at the rate of 2.1 ft.³/min. and air at the rate of 21 ft.³/min. were passed through the bed at room temperature and burnt initially in contact with the top of the bed. The flame gradually burnt back into the bed and after 5 minutes fully fluidised operation was established. Maximum and minimum heat outputs for maximum and minimum methane/air flows were:

|  | Min. | Max. |
|---|---|---|
| Methane flow, ft.³/min | 1.1 | 2.1 |
| Air flow (approx.), ft.³/min | 11 | 21 |
| Heat output, B.t.u./hr | 66,000 | 125,000 |
| Temperature at centre, ° C | 1,150 | 1,070 |
| Bed depth, inches | 3 | 4 |

What I claim is:
1. A method of lighting a fluidised bed furnace when the bed is in a cold state which comprises passing a cold combustible mixture of gases upwardly through the cold bed at a flow rate which is too small to fluidise the bed and igniting the effluent gases at the top surface of the bed so that the gases burn initially at and in contact with the top surface thereby heating the top surface and creating a hot zone which is initially a surface layer of the bed and a cold zone which initially includes all the bed below the surface layer; continuing to pass the combustible mixture of gases upwardly through the bed at a flow rate which maintains the cold zone in a non-fluidised condition and the hot zone in a fluidised condition in which the combustible gases burn within the fluidised zone; heat being gradually transferred downwardly from the hot to the cold zone until the whole bed achieves the hot fluidised condition.

2. A method according to claim 1, in which the mass flow rate of the gases remains constant throughout.

References Cited

UNITED STATES PATENTS 2,584,312 2/1952 White _____ 263—52
3,391,913 7/1968 Jones.

JOHN J. CAMBY, Primary Examiner

U.S. Cl. X.R.

34—10